(12) United States Patent
Palmer et al.

(10) Patent No.: US 6,505,773 B1
(45) Date of Patent: *Jan. 14, 2003

(54) AUTHENTICATED ELECTRONIC COUPON ISSUING AND REDEMPTION

(75) Inventors: Charles Campbell Palmer, Goldens Bridge, NY (US); Elaine Rivette Palmer, Goldens Bridge, NY (US); Sean William Smith, Cornwall, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 37 days.

(21) Appl. No.: 09/054,844

(22) Filed: Apr. 3, 1998

(51) Int. Cl.[7] ................................................ G06K 5/00
(52) U.S. Cl. .......................... 235/380; 705/14; 235/492
(58) Field of Search ................................ 235/380, 379, 235/385, 375, 492; 902/4, 24; 705/14, 26, 27; 348/12, 13

(56) References Cited

U.S. PATENT DOCUMENTS

| | | | |
|---|---|---|---|
| 4,880,964 A | | 11/1989 | Donahue |
| 4,900,904 A | * | 2/1990 | Wright et al. ................ 235/381 |
| 5,231,668 A | * | 7/1993 | Kravitz .......................... 380/28 |
| 5,256,863 A | * | 10/1993 | Ferguson et al. ........... 235/383 |
| 5,287,181 A | * | 2/1994 | Holman ........................ 348/473 |
| 5,380,991 A | * | 1/1995 | Valencia et al. ............ 235/383 |
| 5,557,721 A | | 9/1996 | Fite et al. .................... 395/148 |
| 5,578,808 A | * | 11/1996 | Taylor ......................... 235/380 |
| 5,594,493 A | | 1/1997 | Nemirofsky ............. 235/383 X |
| 5,604,542 A | * | 2/1997 | Dedrick ...................... 348/552 |
| 5,665,952 A | * | 9/1997 | Ziarno ......................... 235/380 |
| 5,710,886 A | | 1/1998 | Christensen et al. |
| 5,710,887 A | * | 1/1998 | Chelliah et al. ............. 395/226 |
| 5,806,044 A | * | 9/1998 | Powell .......................... 705/14 |
| 5,880,769 A | * | 3/1999 | Nemirofsky et al. .......... 348/12 |
| 5,901,287 A | * | 5/1999 | Bull et al. .................... 709/218 |
| 5,905,246 A | * | 5/1999 | Fajkowski ................... 235/375 |
| 5,910,989 A | * | 6/1999 | Naccache ...................... 380/25 |
| 5,924,078 A | * | 7/1999 | Naftzger ....................... 705/14 |
| 5,924,080 A | * | 7/1999 | Johnson ........................ 705/26 |
| 5,956,694 A | * | 9/1999 | Powell .......................... 705/14 |
| 6,014,502 A | * | 1/2000 | Moraes ........................ 709/219 |
| 6,055,513 A | * | 4/2000 | Katz et al. .................... 705/26 |

FOREIGN PATENT DOCUMENTS

| | | |
|---|---|---|
| JP | 11-328269 | * 11/1999 |
| JP | 2000-67312 | * 3/2000 |
| WO | WO 97/30410 | 8/1997 |

* cited by examiner

*Primary Examiner*—Diane I. Lee
(74) *Attorney, Agent, or Firm*—Scully, Scott, Murphy & Presser; Louis P. Herzberg, Esq.

(57) ABSTRACT

An online coupon issuing and redemption system and method receives requests for coupons from consumers, presents advertisements and issues coupons to consumers electronically. The system presents advertisements before issuing the coupons, such that an issuer may be assured its targeted consumer are receiving its advertisements. The coupons are issued on a smart card, thereby eliminating a need for paper coupons. The coupons are digitally signed in order to prevent fraud. In order to prevent further fraudulent tampering of coupons, the redemption station includes a tamper-protected coprocessor for performing operations on the coupons. The system further includes capability for the redemption station to link to an issuing station for electronic reimbursements.

9 Claims, 9 Drawing Sheets

AUTHENTICATED ELECTRONIC COUPON ISSUING AND REDEMPTION

TECHNICAL FIELD

The present invention relates to consumer shopping in general, and more particularly to an electronic advertisement and coupon issuance and redemption system.

BACKGROUND ART

Retailers and manufacturers often sponsor incentive programs for persuading consumers to buy their products. These incentives include discount coupons distributed to consumers whereby a consumer may redeem the coupon when purchasing an associated item. Such coupons are usually distributed in paper forms.

The problems associated with paper coupons today are that the retailer and manufacturers who advertise cannot assure that consumers who use paper coupons have actually read the product advertisements which accompany the coupons. The advertisers do not have a way of knowing who is viewing their advertisements and cannot dynamically adjust the advertisement to fit the viewer's tastes and interests.

In addition, many cases of fraud related to paper coupons are occurring today. For example, paper coupons are easily counterfeited. Some consumers commit fraud by redeeming coupons for merchandise they have not purchased. Some retailers also commit fraud by redeeming coupons for merchandise which consumers have not purchased.

Manufacturers must rely on the cashiers and computer systems at retail establishments to assure that consumers who redeem coupons have actually bought the targeted product and that the coupons redeemed were not expired at the time of redemption. Retailers often rely on their cashiers to enforce coupon redemption rules. Other retailers rely on computerized systems to compare coupon bar codes to the consumer's purchases.

U.S. Pat. No. 4,880,964 Donahue describes paper coupons with bar codes printed on them, and thus does not solve the deficiencies of paper coupons described above. U.S. Pat. No. 5,710,866 by Christensen et al. describes electronically generated coupons but requires a database of customers and spent coupons which is costly to maintain. It also requires online connection to the database at redemption time to determine if the coupon is valid.

SUMMARY OF THE INVENTION

The present invention is an online coupon issuing and redemption system. The issuing system of the present invention includes an issuing station. The issuing station is generally comprised of a computer located usually at a manufacturer's site. The issuing station typically generates advertisements and coupons electronically. The issuing system also includes a consumer station, usually a computer and a smart card reader/writer generally located at the consumer site. The smart card reader/writer may be linked to the consumer computer either directly or via a LAN or other network connections.

The issuing station and consumer station are linked via a communications network. When a consumer makes requests via the consumer station for coupons, the issuing station transmits the advertisement and coupons it generated to the consumer station. The issuing station also has a capability of digitally signing the coupons. Digital signatures insure the authenticity of the coupons as well as that of the issuer and the issuing station. Also included in the transmission is a program having a capability to run on the consumer station. The program is responsible for making sure that the consumer absorbs the entire advertisement and transferring the coupons to a smart card via the smart card reader/writer linked to the consumer station.

Accordingly, it is the object of the present invention to assure the advertisers that a consumer actually perceives the advertisement for a product before receiving discount coupons.

The system of the present invention also includes a redemption system. The redemption system generally comprises a redemption station, typically a computer, and a smart card reader/writer linked to the redemption computer. The redemption system is typically located at a purchasing site. When a consumer is ready to make a purchase, the consumer inserts the smart card having electronic coupons stored in it into the smart card reader/writer linked to the redemption station. The redemption system reads the coupons via the smart card reader/writer and matches the purchased items with coupons. The matched coupons are extracted from the smart card, so that they may not be used again. At the same time, the redemption system deletes any expired coupons stored in the smart card.

The redemption system also may include a tamper-protected secure coprocessor. In order to protect a manufacturer from fraudulent merchants and customers, operations which assess the validity of coupons, operations which update, collect, store, or delete coupons may take place inside a tamper-protected hardware boundary. The hardware boundary is part of typical tamper-protected secure coprocessors and smart cards.

Accordingly, it is yet another object of this invention to provide a tamper-protected access to the coupons stored in the smart cards.

Alternatively, the system of the present invention may include a database of coupons stored in the issuing station. The database may include a list of coupons issued or already spent. When a consumer is ready to redeem the coupons, the redemption station links to the database and validates the coupons stored in the consumer's smart card by comparing the smart card coupons with a list of coupons in the database. Only the valid coupons matching the list in the database may be actually redeemed.

The system of the present invention also includes a communications link between a redemption station and an issuing station. Such a link is established when a merchant wants reimbursements from the manufacturer for the coupons the merchant redeemed to the consumers. Typically the redemption computer sends electronic coupons which have been digitally signed to the issuing computer. The issuing computer validates the electronic signatures on the coupon. If the signatures are valid, the manufacturer reimburses the merchants for the valid coupons. Accordingly, it is a further object of the present invention to provide a mechanism for the manufacturer to electronically reimburse the merchants.

DESCRIPTION OF THE PREFERRED EMBODIMENT

Figure 1:
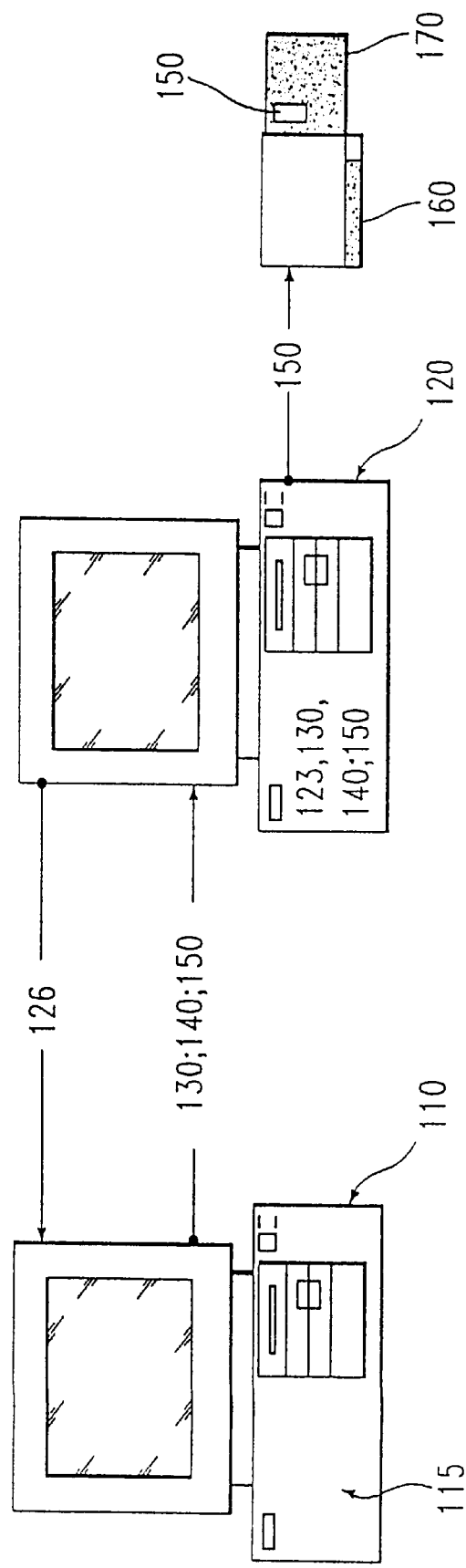
FIG. 1 is an exemplary diagram illustrating a physical architecture of an issuing system of the present invention.

FIG. 1 is an exemplary diagram illustrating a physical architecture of an issuing system of the present invention. An authenticated electronic coupon issuing system shown in FIG. 1 includes an issuing station, typically a computer 110 running issuing software 115; a viewing station, typically an advertisement viewing computer 120 running advertisement viewing software 123 which sends requests for coupons 125 to an issuing computer 110; an advertisement viewing computer 120 running advertisement applet software 130; an electronic advertisement 140; an electronic coupon which is digitally signed 150; a dispensing smart card reader/writer 160; a customer's smart card 170 holding an electronic coupon 150. A typical smart card may be a chip card having an integrated circuit that is resistant to physical tampering. An issuing station typically comprises a computer at a manufacturer or clearing house site. Likewise, a viewing station typically comprises of a computer at a customer site. A customer is typically a consumer who receives coupons electronically and makes purchases using the coupons.

A dispensing smart card reader/writer 160 is attached to an advertisement viewing computer 120 and is accessible by advertisement applet software 130.

Issuing software 115, advertisement viewing software 123, and advertisement applet software 130 are typically purchased from software vendors. An electronic advertisement 140 is supplied by an advertisement content vendor. A customer's smart card 170 may be purchased from a smart card vendor. Likewise, a customer's smart card reader/writer 160 may be supplied by a smart card reader/writer vendor. An issuing computer 110 and an advertisement viewing computer 120 may be obtained from computer hardware vendors. An electronic coupon 150 is generated by issuing software 115. A request for coupons 125 is generated by advertisement viewing software 123.

Figure 2:
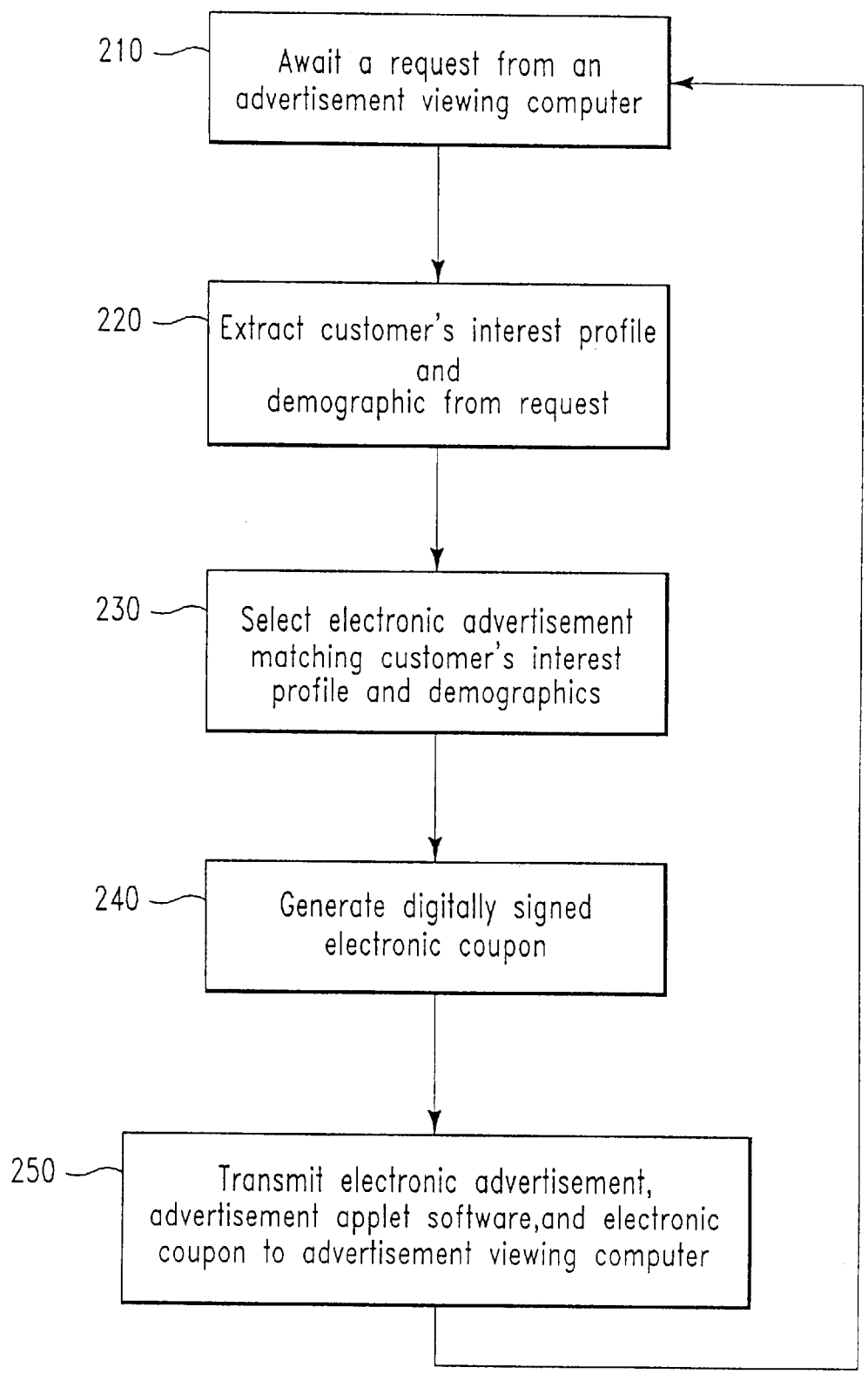
FIG. 2 is a flow diagram illustrating one possible logic flow of issuing software running on the issuing computer of the present invention.

FIG. 2 is a flow diagram illustrating one possible logic flow of issuing software running on the issuing computer of the present invention. Initially in step 210, the issuing software awaits a request from an advertisement viewing computer. A request includes information about the customer, such as his interests (e.g., propensity for playing tennis), and demographics (e.g., a senior citizen). In step 220, the issuing software retrieves a customer's interest profile and demographics from a request. In step 230, the issuing software selects an electronic advertisement which matches a customer's interest profile and demographics. For example, if a customer is a senior citizen, the issuing software selects an electronic advertisement targeted at senior citizens, not one targeted at teenagers. In step 240, the issuing software generates an electronic coupon which Digital signatures are generally created by piping a sender's private key and the contents of the message into an algorithm. The output of the algorithm is the digital signature. The recipient can verify the digital signature by using the sender's public key and the message. The digital signature is secure because it would be virtually impossible for another computer to produce the identical digital signature. Each user has the responsibility of protecting the private key.

In step 250, the issuing software transmits an electronic advertisement, advertisement applet software, and an electronic coupon to an advertisement viewing computer. The issuing software then waits for another request from the advertisement viewing software.

Figure 3:
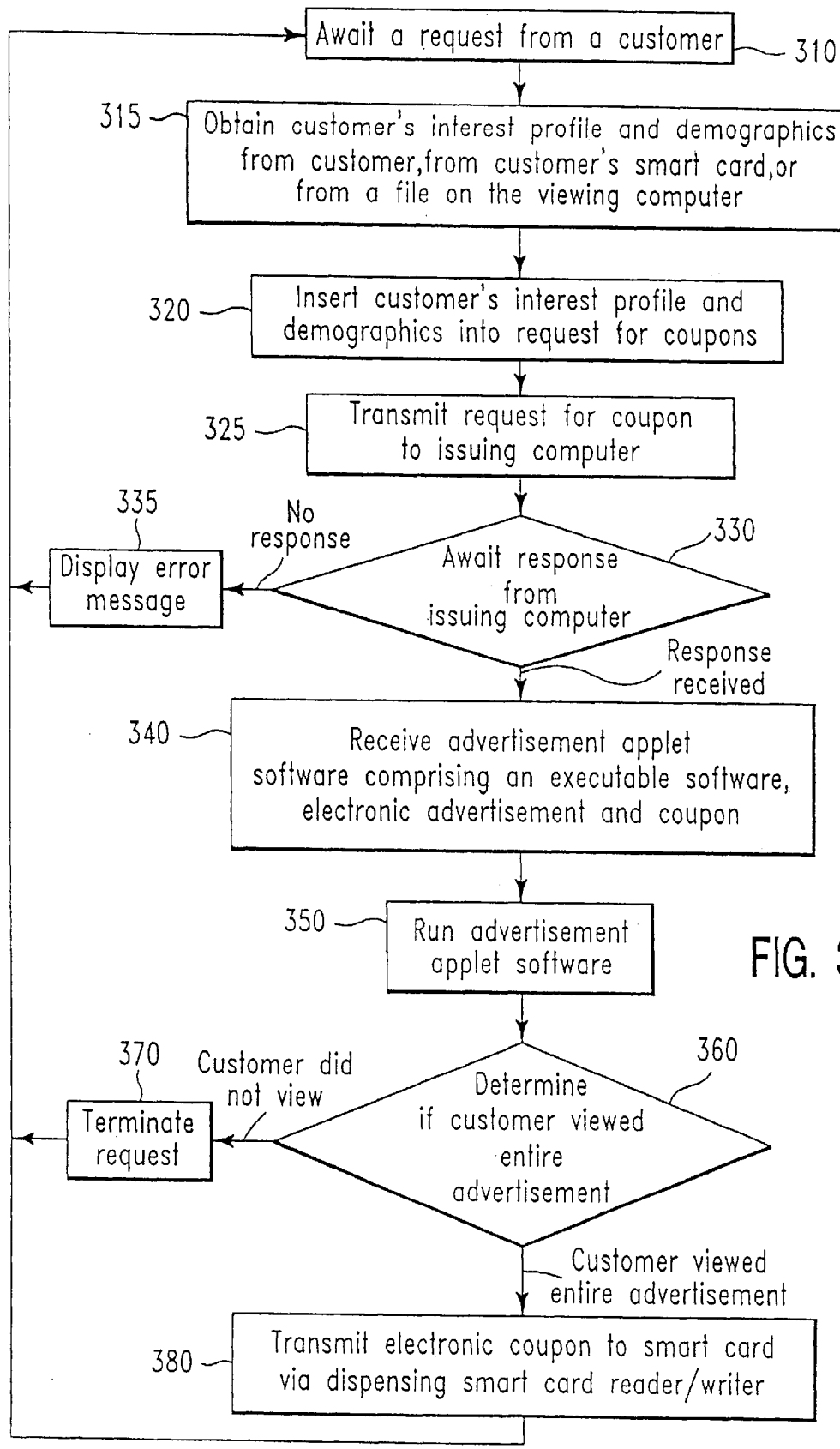
FIG. 3 is a flow diagram illustrating one possible logic flow of advertisement viewing software running on the viewing computer of the present invention.

FIG. 3 is a flow diagram illustrating one possible logic flow of advertisement viewing software running on the viewing computer of the present invention. In step 310, the advertisement viewing software awaits a request for a coupon from a customer. In step 315, the viewing software obtains information about a customer, such as his interests and demographics. The viewing software may obtain the information directly from a customer through a dialogue, or from a customer's smart card, or from a file on the viewing computer. In step 320, the viewing software includes a customer's interest profile and demographics with a request for a coupon. In step 325, the viewing software transmits a request for a coupon to an issuing computer. In step 330, the viewing software awaits a response from an issuing computer. If there is no response, the viewing software times out, in step 335, displays an error message and, in step 310, awaits for another request from a customer. If there is a response from an issuing computer, the viewing software receives advertisement applet software, an electronic advertisement, and an electronic coupon as shown in step 340. In step 350, the viewing software then runs advertisement applet software. The software determines, in step 360, if the customer viewed an entire advertisement. In step 370, if the applet software times out or if a customer exited the software prematurely, the viewing software terminates the session and returns to wait for another request from a customer in step 310. In step 380, if the applet determines that a customer did view the entire advertisement, the applet software transmits an electronic coupon which is digitally signed to a customer's smart card via a dispensing smart card reader/writer.

An example of viewing software may include a World Wide Web (Web) page having a uniform resource locator (URL) address which a consumer may access via a Web browser. The URL address would be located in the web server linked to an issuing station. The Web page may have a number of parameter fields as input fields which the consumer is required to fill. The Web page with the parameters may then be transmitted to the web server at the issuing station. The web server together with issuing software may then use the parameters to generate electronic advertisements and coupons, transmitting them with an applet software to the viewing software. The viewing software typically launches the applet software. The launched applet software displays the advertisements on the consumer station, controlling the station's interaction with the consumer. The applet software may also be responsible for transferring the coupons to the consumer's smart card. Furthermore, the applet software may provide interactivity, for example, requiring that the consumer answer questions about the product or advertisement, to assure that the consumer is truly absorbing the advertising information.

Figure 4:
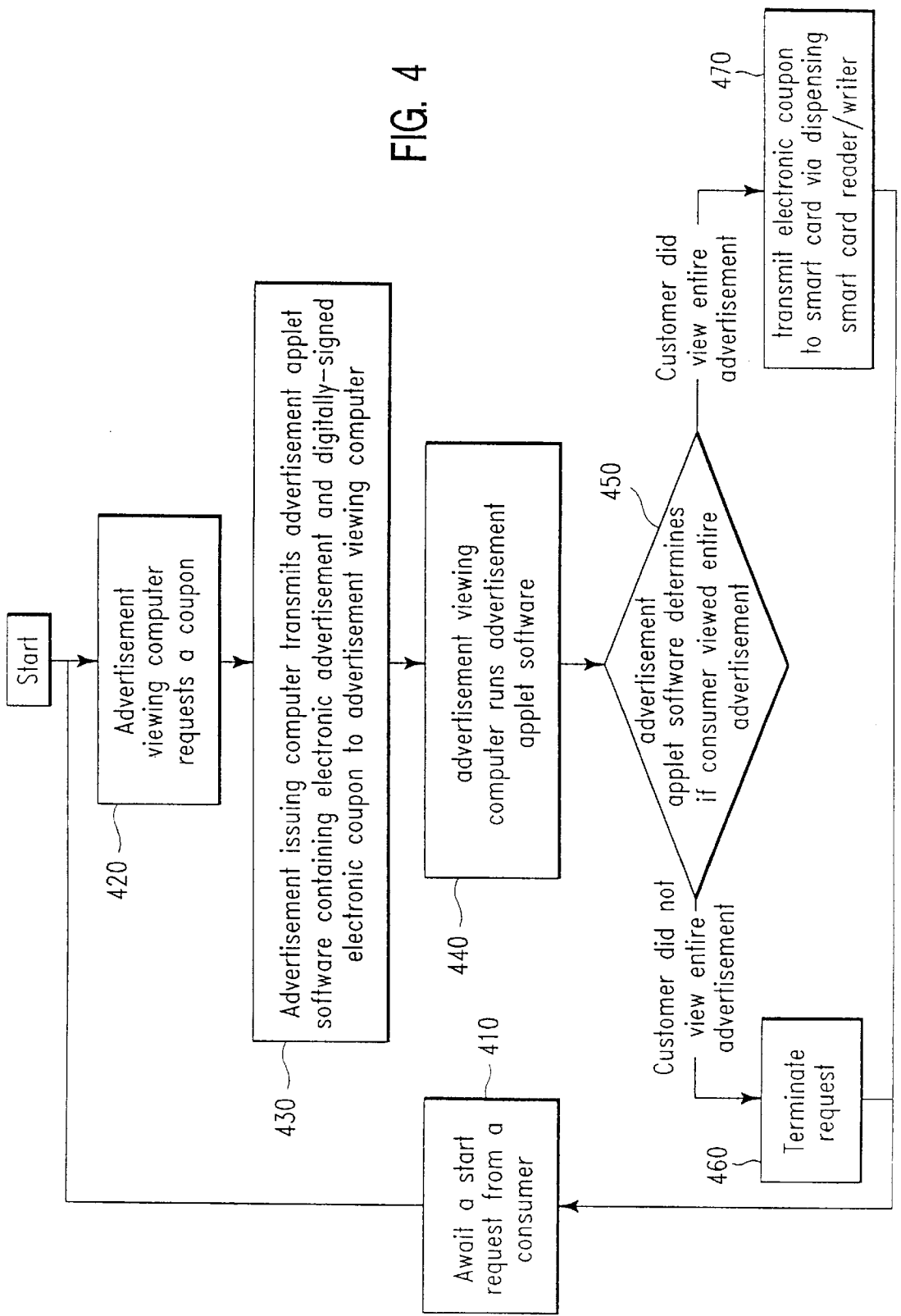
FIG. 4 is a flow diagram illustrating one possible logic flow for interaction between advertisement viewing software and issuing software.

FIG. 4 is a flow diagram illustrating one possible logic flow for interaction between advertisement viewing software and issuing software. In step 420, an advertisement viewing computer requests an electronic coupon from an issuing computer. In step 430, an issuing computer transmits advertisement applet software, an electronic advertisement, and an electronic coupon which is digitally signed to an advertisement viewing computer. In step 440, an advertisement viewing computer runs applet software. The applet software displays an electronic advertisement. In step 450, the applet software determines how to proceed based on whether or not a customer viewed an entire advertisement. In step 460, if a customer does not view an entire electronic advertisement, the advertisement applet software terminates the session and awaits another request, step 410. If, however, a customer views an entire electronic advertisement, in step 470, the applet software rewards the customer by transmitting an electronic coupon which is digitally signed to a customer's smart card. The smart card is typically inserted into a dispensing smart card reader/writer. Furthermore, the advertisement applet software may be interactive, requiring that a customer answer questions about a product or advertisement, to assure that a customer is truly absorbing the advertising information. Secure protocols, tamper-protected hardware, or record keeping databases typical in electronic money systems may be employed to prevent consumers and retailers from double spending or duplicating the electronic coupons. A suitable example for such secure protocols are described in detail in M. Bellare et al., "iKP—A Family of Secure Electronic Payment Protocols", Jul. 12, 1995, available from IBM.

Electronic coupons are not printed, therefore they cannot be printed over and over again, or photocopied. The number of electronic coupons a smart card may hold may be limited.

Figure 5:
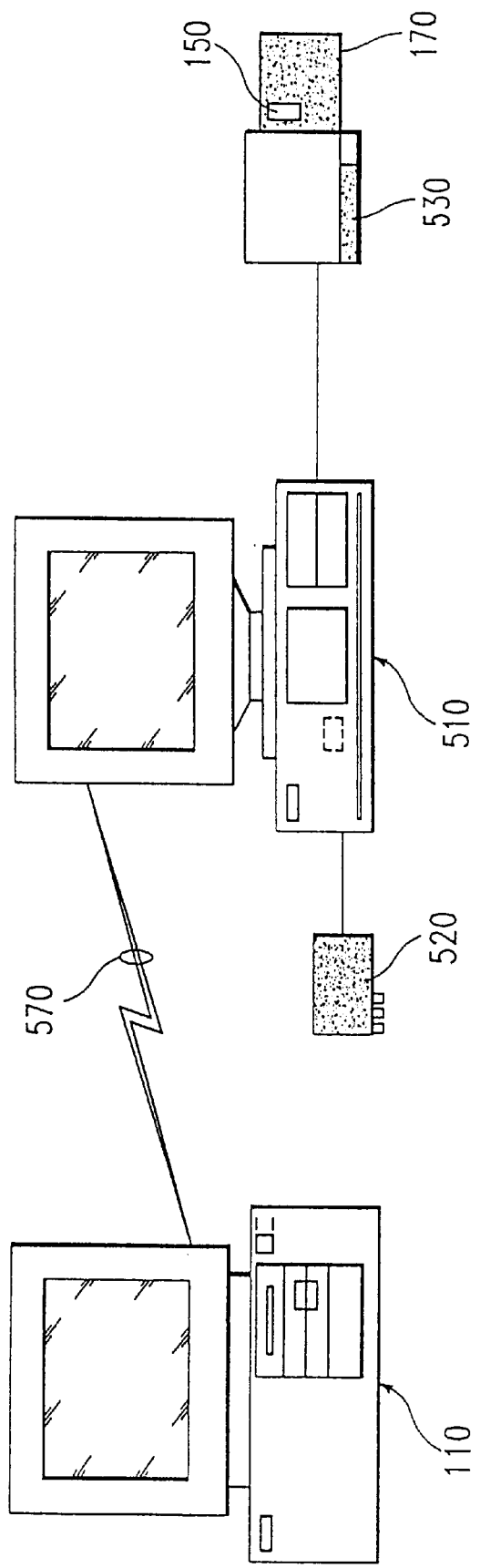
FIG. 5 is an illustrative example showing a physical layout of a redemption system architecture in the present invention.

FIG. 5 is an illustrative example showing a physical layout of a redemption system architecture in the present invention. An authenticated coupon redemption system as shown in FIG. 5 comprises a redemption computer 510, a tamper-protected secure coprocessor 520, a redemption smart card reader/writer 530, a customer's smart card storing a digitally signed electronic coupon 150, and an issuing station. An issuing station is typically comprised of a computer 110 and is generally resident at a manufacturer or at a clearing house that performs the duties for a manufacturer or a group of manufacturers. A redemption smart card reader/writer 530 is typically attached to a redemption computer 510. A tamper-protected secure coprocessor 520 is connected to a redemption computer 510 either directly or via a communications network. A redemption computer 510 may also be connected to an issuing computer 110, typically via phone line 570.

Figure 6:
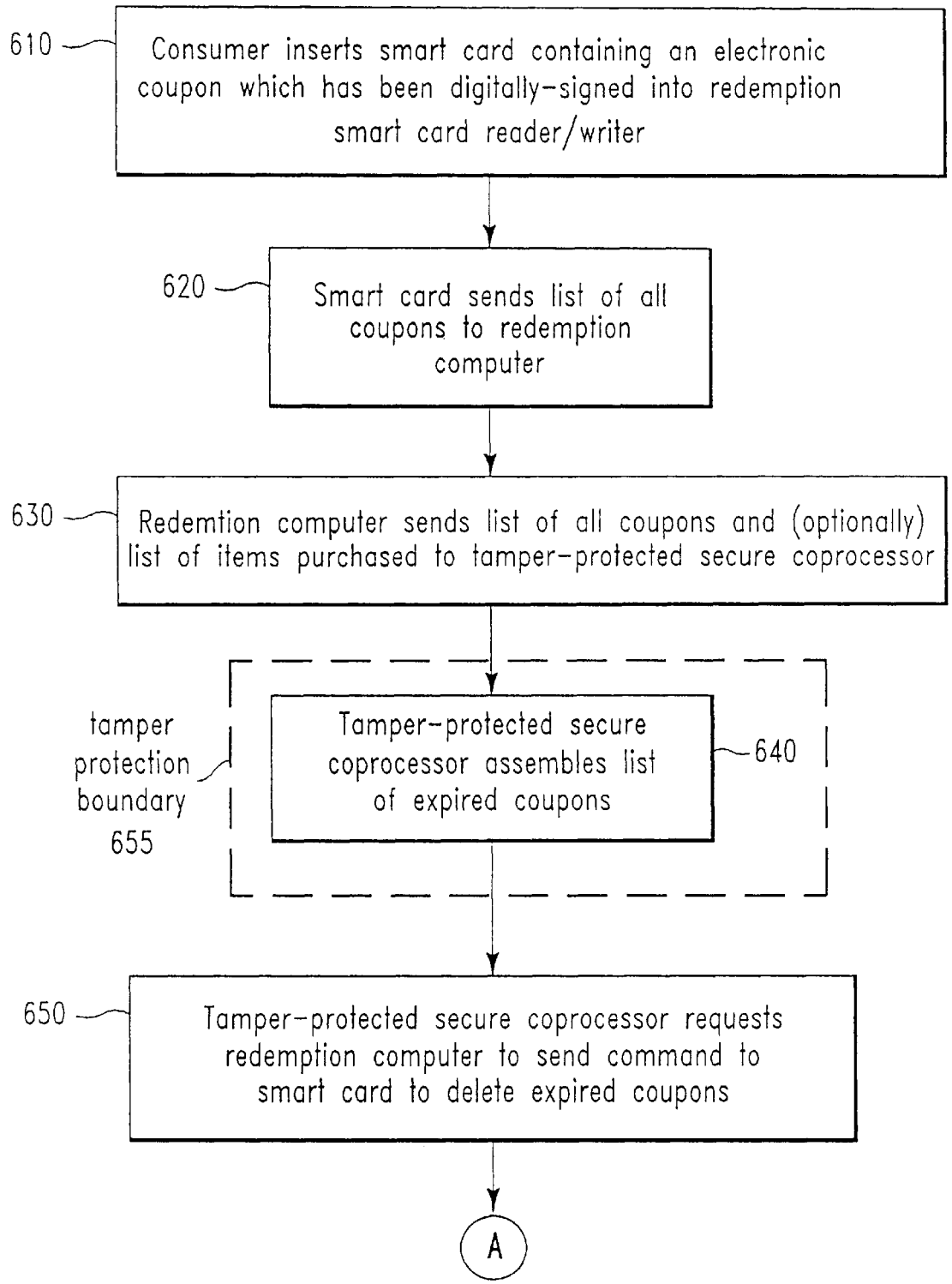
FIGS. 6 and 7 are a flow diagram illustrating one possible logic flow in the redemption system during a typical point of sale.
Figure 7:
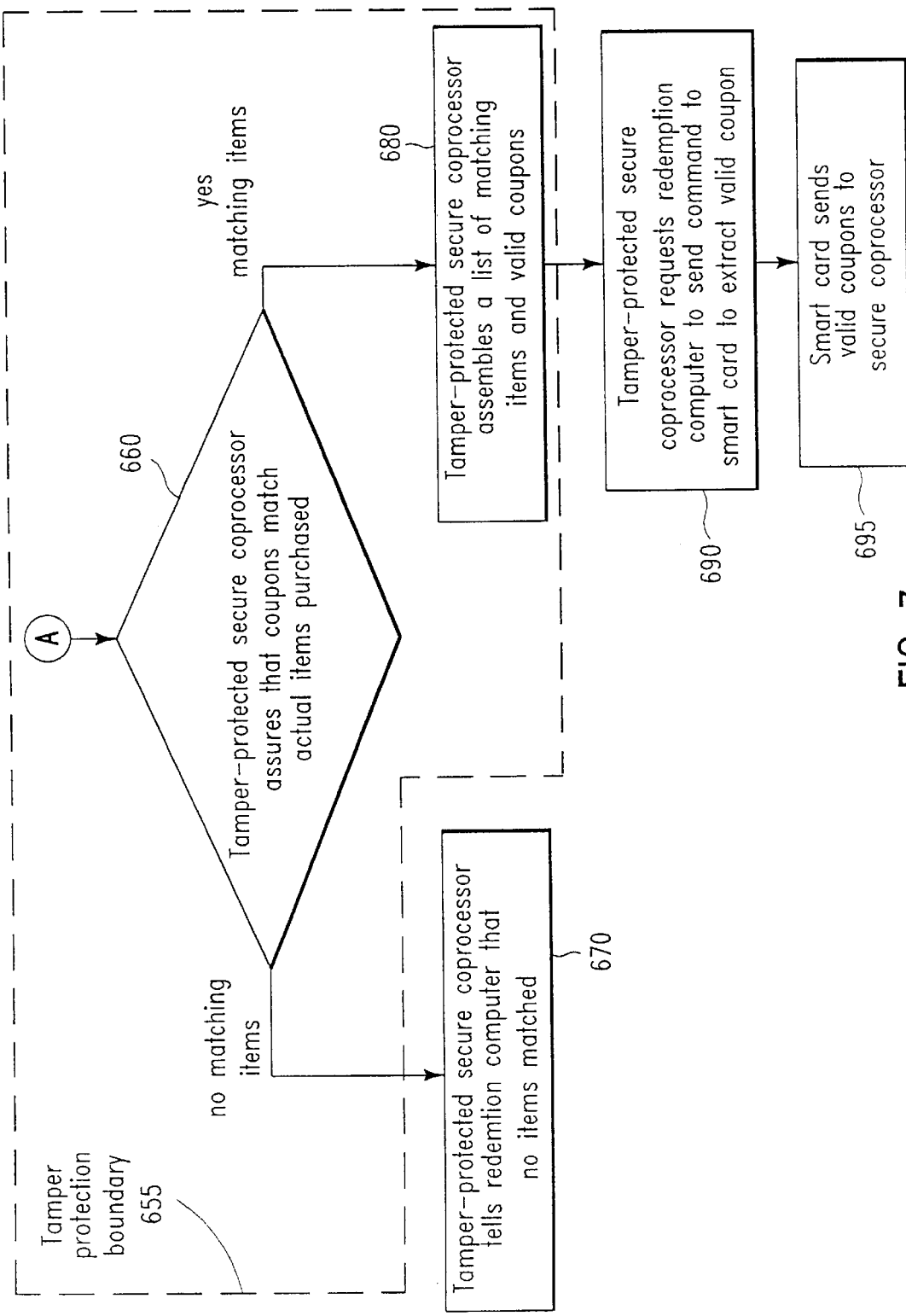

FIGS. 6 and 7 are a flow diagram illustrating a possible logic flow in the redemption system during a typical point of sale. In step 610, a consumer inserts the smart card 170 FIG. 1 into a redemption smart card reader/writer 530 FIG. 5. The smart card includes electronic coupons which have been digitally signed 150 FIG. 1. In step 620, the smart card sends a list of all coupons stored in it to a redemption computer 510 FIG. 5. In step 630, a redemption computer forwards the list of coupons and optionally a list of items purchased to a tamper-protected secure coprocessor 520 FIG. 5. In step 640, the tamper-protected secure coprocessor 520 FIG. 5 examines the list of all coupons, and assembles a list of those which have expired. In step 650, the tamper-protected secure coprocessor 520 FIG. 5 requests a redemption computer to send a command to a smart card to delete expired coupons. Next, in step 660, the tamper-protected secure coprocessor searches for non-expired coupons that match actual items purchased. If there are no matching items, in step 670, the tamper-protected secure coprocessor tells the redemption computer that no items matched the coupon list. If there are matching items, in step 680, the tamper-protected secure coprocessor assembles a list of matching items and valid coupons. In step 690, the coprocessor requests the redemption computer to send a command to the smart card to extract valid matching coupons. In step 695, the smart card sends the valid matching coupons to the tamper-protected secure coprocessor.

In order to protect a manufacturer from fraudulent merchants and customers, operations which assess the validity of coupons, operations which update, collect, store, or delete coupons take place inside a tamper-protected hardware boundary 655. The hardware boundary is part of typical tamper-protected secure coprocessors and smart cards. A typical tamper-protected secure coprocessor may be a tamper-protected computing device having a microprocessor and memory in a tamper-protected enclosure, such as the IBM 4758.

Figure 8:
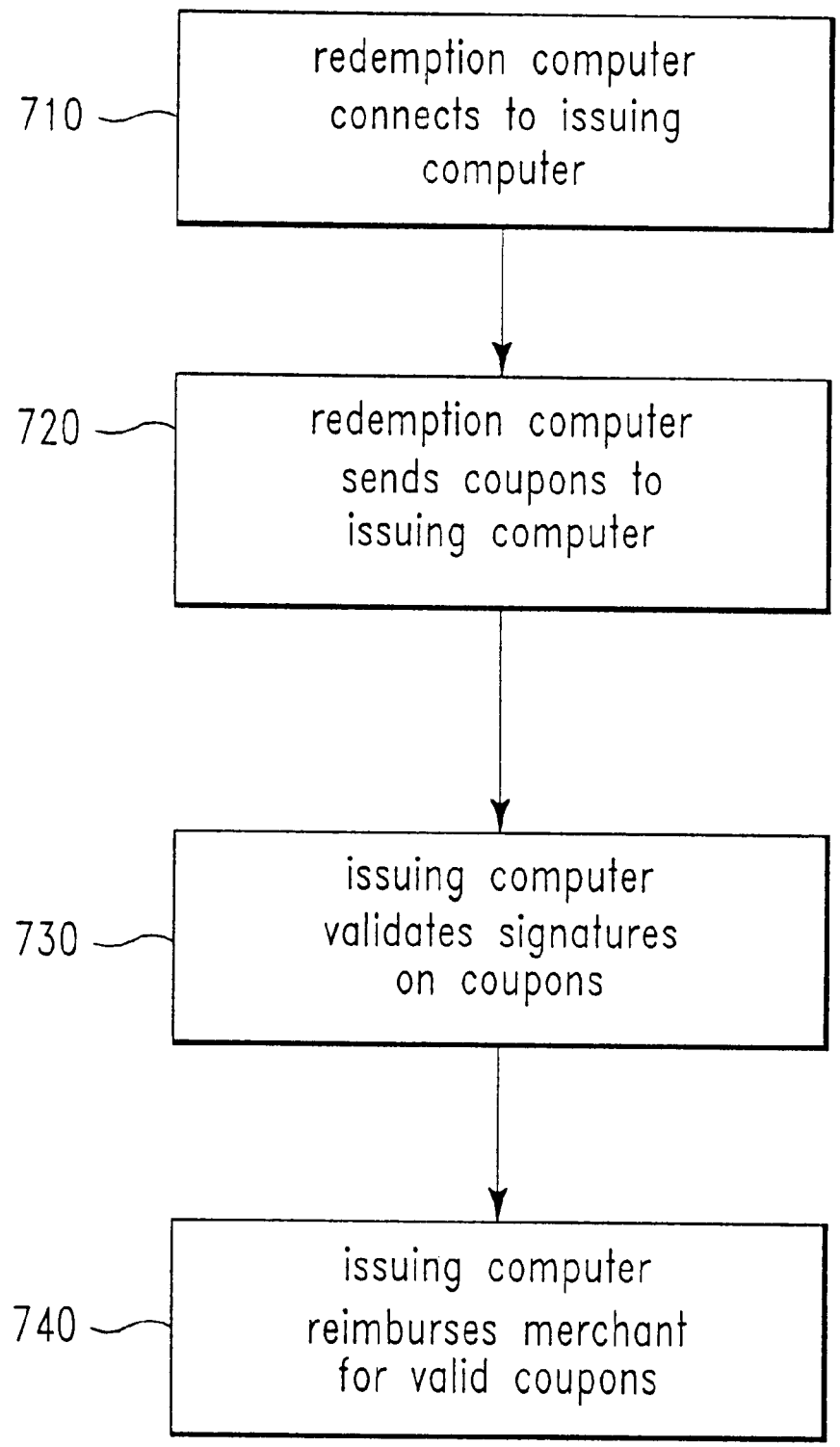
FIG. 8 is a flow diagram illustrating a possible logic flow in a typical daily coupon closeout.

FIG. 8 is a flow diagram illustrating a possible logic flow during a typical daily coupon close-but. In step 710, a redemption computer 510 FIG. 5 connects to the issuing computer 110 FIG. 5 or clearing house computer. Such connection would generally occur at the end of the day, or at some appropriate period of time. In step 720, the redemption computer 510 FIG. 5 sends electronic coupons which have been digitally signed 150 FIG. 5 to the issuing computer 110 FIG. 5. In step 730, the issuing computer validates the electronic signatures on the coupons. In step 740, the clearing house reimburses the merchant for the valid coupons.

Figure 9:
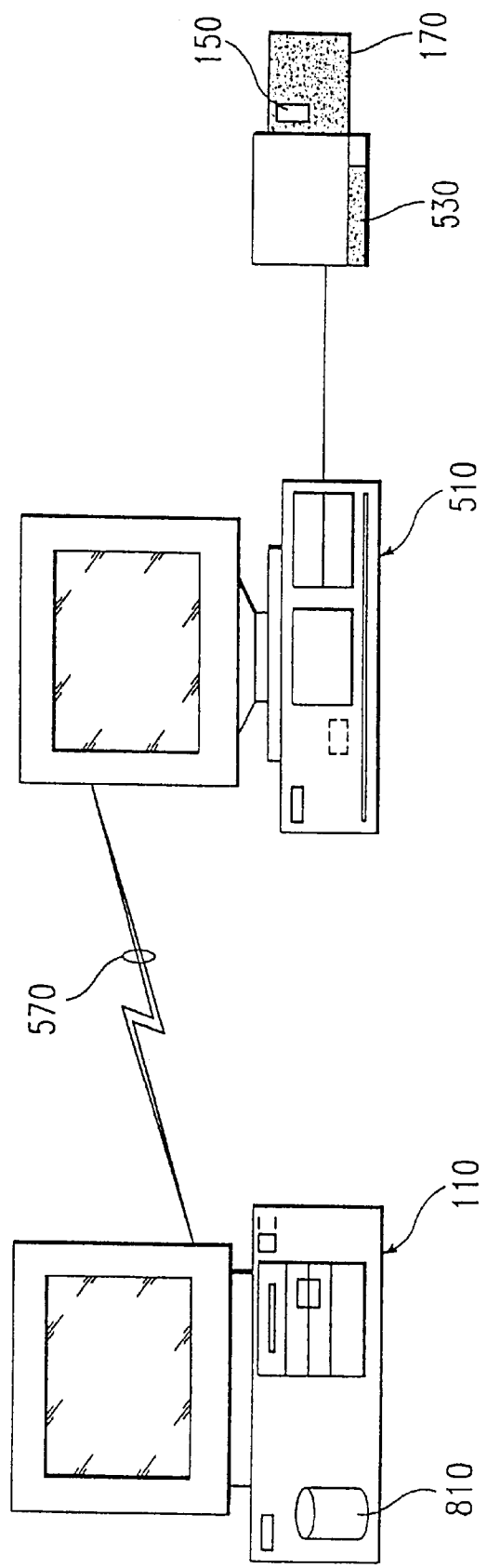
FIG. 9 is an illustrative example showing a physical layout of a software-based redemption system of the present invention in its alternative embodiment.

FIG. 9 is an illustrative example showing a physical layout of a software-based redemption system of the present invention in its alternative embodiment. The embodiment shown in FIG. 9 replaces the tamper-protected secure coprocessor 520 FIG. 5 in the redemption computer 510 FIG. 5 with a database of coupons 810 in the issuing computer 110 FIG. 5. The database includes either a list of already spent coupons (so as to reject them if they are presented a second time) or a list of unspent coupons, from which it deletes coupons as they are presented for redemption. When a merchant connects to the issuing computer 110 to redeem the coupons, the issuing computer 110 searches the database 810 to determine if the coupons are valid. Only the valid coupons found in the database 810 may then be redeemed.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A coupon issuing system for electronically presenting advertisements and generating coupons, said system comprising:

at least one issuing station for generating electronic advertisements, electronic coupons and advertisement software programs according to predetermined criteria, digitally signing the electronic coupons, and transmitting the electronic advertisements, digitally signed electronic coupons and the advertisement software programs;

at least one customer station, separate from the issuing station, to transmit from a user to the issuing station a request for an electronic coupon;

at least one smart card for holding information including said electronic coupons; and at least one smart card reader/writer for communicating information held in said at least one smart card to said at least one customer station;

wherein the issuing station includes means for receiving the request from the user for the electronic coupon, and for transmitting one of the electronic advertisements, one of the digitally signed electronic coupons, and one of the advertisement software programs to the customer station in response to receiving the request from the user for the electronic coupon;

wherein, after receipt of the one of the electronic advertisements, the one of the digitally signed electronic coupons, and the one of the advertisement software programs, the customer station presents the one of the electronic advertisements and uses said one of the advertisement software programs to monitor interaction of the user with the presented advertisement and, when the advertisement software program detects a predefined criterion of said interaction, said at least one software program issues the one of the electronic coupon by transferring said one of the digitally signed electronic coupon to said smart card via said smart card reader/writer.

2. The system as in claim 1, wherein said system further includes a user interface program for displaying information including request forms and the advertisements, whereby the advertisements are presented visually to the user via the customer station.

3. The system as in claim 2, wherein said user interface program comprises a Web browser running on the customer station.

4. The system as in claim 3, wherein said at least one software program includes a platform independent program downloadable dynamically from said issuing station, said at least one software program further controlling displays in conjunction with said Web browser.

5. The system as in claim 1, wherein said advertisements are updated over predefined intervals.

6. A method for advertising and issuing at least one coupon electronically, said method comprising:

receiving at an issuing station a request for said electronic coupon from a consumer;

generating at the issuing station said electronic coupon, at least one electronic advisement, and at least one advertisement software program;

the issuing station digitally signing the electronic coupon;

transmitting said digitally signed electronic coupon, said at least one electronic advertisement, and said at least one advertisement software program from the issuing station to a consumer's station;

the customer station presenting said at least one electronic advertisement and using said at least one advertisement software program to monitor interaction of the consumer with said at least one electronic advertisement; and said customer station using the at least one advertisement software program to issue the electronic coupon by transferring said digitally signed electronic coupon to a smart card, if said consumer's interaction with said advertisement meets a predefined criterion; and wherein the issuing station transmits the electronic advertisement and the electronic coupon to the consumer's station in response to receiving the request from the consumer for the coupon.

7. The method according to claim 6, wherein said method further includes the step of retrieving an interest and demographic profile for said consumer before the step of generating.

8. The method according to claim 6, wherein said method further includes the steps of:

reading a list of said electronic coupon stored in said smart card;

deleting from said smart card said electronic coupon which have expired;

matching valid said electronic coupon with purchased items; and extracting valid matching said electronic coupon, and thereby redeeming said consumer's electronic coupon when said consumer purchases items associated with said electronic coupon stored in said smart card.

9. The method according to claim 6, wherein said method further includes the steps of:

the consumer redeeming the coupon in a transaction with a merchant; and the merchant receiving reimbursement for the coupon by establishing a connection to the issuing station, sending said digitally signed electronic coupon to said issuing station, the issuing station assessing the validity of the digital signature of the coupon, and if the digital signature is valid, the issuing station reimbursing the merchant for the coupon.

* * * * *